Sept. 20, 1949.  R. G. HILTON ET AL  2,482,415
PIN-GEARED KNUCKLE
Filed June 27, 1947
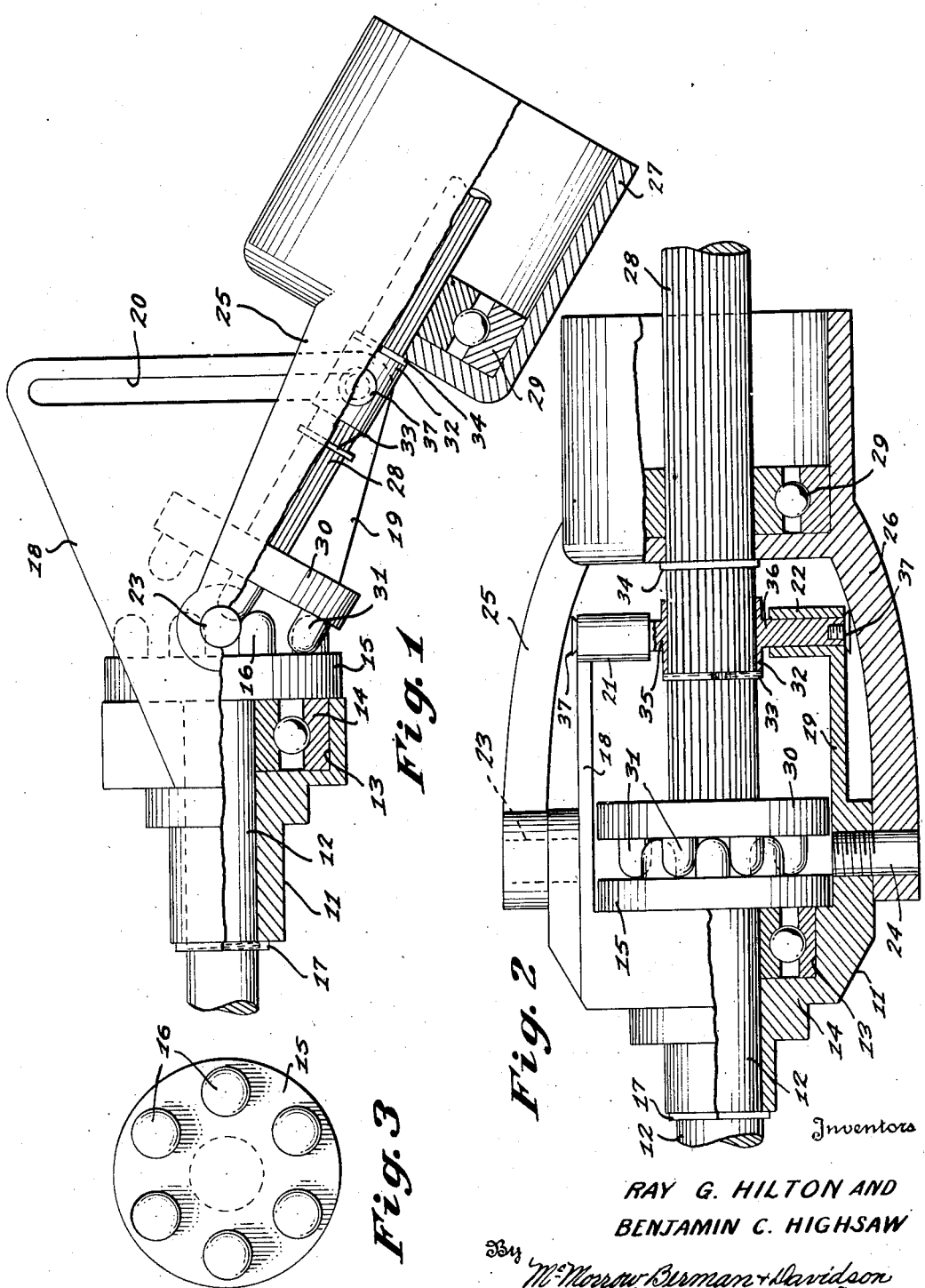
RAY G. HILTON AND
BENJAMIN C. HIGHSAW
By McMorrow, Berman + Davidson
Attorney.

Patented Sept. 20, 1949

2,482,415

UNITED STATES PATENT OFFICE 2,482,415

PIN-GEARED KNUCKLE

Ray G. Hilton, Austin, and Benjamin C. Highsaw, Beaumont, Tex.

Application June 27, 1947, Serial No. 757,596

4 Claims. (Cl. 74—380)

This invention relates to hinged joints and more particularly to a joint for coupling two rigid shafts together while permitting one of the shafts to angle freely relatively to the other shaft.

A main object of the invention is to provide a novel and improved flexible coupling for rigid shaft elements, said coupling being very simple in construction, efficient in operation and operative smoothly over a substantial angular range of connection between the shaft elements.

A further object of the invention is to provide an improved hinged coupling for rigid shaft elements which is sturdy in construction, inexpensive to manufacture and reliable in performance.

Further objects and advantages of the invention will become apparent from the following description and claims, and from the accompanying drawings, wherein:

Figure 1 is a top plan view, partly in cross-section, of a knuckle joint constructed in accordance with the present invention.

Figure 2 is a side elevational view, partly in cross-section, of the knuckle joint of Figure 1.

Figure 3 is an elevational front view of a pin gear element employed in the knuckle joint of Figure 1.

Referring to the drawings, 11 designates a shaft bearing housing in which is journalled a shaft element 12, housing 11 being formed with an annular bearing seat 13 in which is positioned a ball bearing assembly 14 providing an anti-friction bearing between shaft 12 and the seat 13. Secured to the end of shaft 12 adjacent the bearing assembly 14 is a circular disc member 15 formed on its forward face with a plurality of forwardly projecting rounded pin elements 16 which are equally spaced and arranged on a circle concentric with the axis of shaft element 12.

Secured to shaft element 12 is a collar 17 which rotatively engages the rear surface of housing 11 and retains the shaft element against forward axial movement in said housing.

Housing 11 is formed with top and bottom forwardly projecting triangular horizontal arms shown respectively at 18 and 19, said arms being formed at their forward ends with transverse slots 20, the arms being formed with opposing inwardly directed skirts shown respectively at 21 and 22 at the peripheral edges of said slots.

Threaded into the top and bottom of housing 11 on an axis at right angles to the axis of shaft 12 and located substantially in the median transverse plane of the pin elements 16 are stud members 23 and 24 and pivotally engaged with said stud members are the respective arms 25 and 26 which project rearwardly from a second housing member 27 in which is journalled a shaft element 28 by means of a ball bearing assembly 29. The rear end of shaft element 28 carries a circular disc element 30 similar to disc element 15, and projecting rearwardly from the face of disc element 30 are the spaced rounded pin members 31 arranged to fit in the spaces between the pin members 16 and being substantially identical in shape therewith. Encircling shaft element 28 is a sleeve 32 which is retained against axial movement on said shaft element by collars 33 and 34 secured to the shaft element and rotatively abutting the respective rear and front edges of the sleeve. Extending vertically from said sleeve are respective top and bottom lugs 35 and 36 which pass slidably through the skirts 21 and 22 and are provided with flanged bolts 37 threaded into their ends to retain them in the respective slots 20 of the arms 18 and 19.

When the shafts 12 and 28 are in axial alignment, torque is transmitted from one shaft to the other by the interfitting cooperation of the pin elements 16 and 31 carried by the respective disc members 15 and 30. When the shafts are angled with respect to each other, housing 27 is rotated around the stud members 23 and 24 in a plane parallel to the planes of the arms 18 and 19, and the shaft 28 is retracted slightly by the camming engagement of the studs 35 and 36 with the respective straight transverse slots 20 in said arms. The retraction of shaft 28 provides sufficient clearance at the interengaging pin elements 16 and 31 in the angled positions of disc members 15 and 30 to prevent binding or excessive friction at said pin elements. This insures smooth transmission of torque from one shaft element to the other shaft element over the entire range of angular deviation between said shaft elements allowed by the cooperation of the studs 35 and 36 with the straight slots 20, said allowable angular deviation being limited only by the length of said slots. Wear of the pin elements and power loss in the knuckle joont due to friction are therefore minimized and smooth power transmission is obtained at the joint.

While a specific embodiment of a hinged joint between shaft elements has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A knuckle joint comprising a first shaft, a disc element at the end of said first shaft, a second shaft, a disc element at the end of said second shaft, interengaging pin members carried by said disc elements, a bearing housing in which said first shaft is journalled, a bearing housing in which said second shaft is slidably journalled, means pivotally connecting said housings for relative rotation around an axis passing through said interengaging pin members, and cam means for retracting one shaft relative to the other shaft responsive to said relative rotation.

2. A knuckle joint comprising a first shaft, a disc element at the end of said first shaft, a second shaft, a disc element at the end of said second shaft, interengaging pin members carried by said disc elements, a bearing housing in which said first shaft is journalled, a bearing housing in which said second shaft is slidably journalled, means pivotally connecting said housings for relative rotation around an axis transverse to one of said shafts and passing through said interengaging pin members, and cooperating cam means carried by the other shaft and the first housing for retracting said other shaft responsive to said relative rotation.

3. A knuckle joint comprising a first shaft, a second shaft, interengaging pin members carried at the ends of the shafts, a bearing housing in which said first shaft is journalled, a second bearing housing in which the second shaft is slidably journalled, means pivotally connecting said housings for relative rotation around an axis passing through said interengaging pin members, and cam means for retracting one shaft relative to the other shaft responsive to said relative rotation, said cam means including a yoke secured to said first bearing housing, a pair of arms secured to said second bearing housing adapted to be rotatably pinioned at their ends on said yoke, a slotted extension on said yoke, and a slidable collar on said second shaft engageable with said slotted extension, whereby said discs are movable relative to each other.

4. A knuckle joint comprising a first shaft, a second shaft, interengaging pin members carried at the ends of the shafts, a bearing housing in which said first shaft is journalled, a second bearing housing in which said second shaft is journalled, means pivotally connecting said housings for relative rotation around an axis transverse to said first shaft and passing through said interengaging pin members, and cam means for retracting one shaft relative to the other shaft responsive to said rotation, said cam means acting in a plane normal to said axis.

RAY G. HILTON.
BENJAMIN C. HIGHSAW.

REFERENCES CITED

The following references are of record in the file of this patent:

UNITED STATES PATENTS

| Number | Name | Date |
| --- | --- | --- |
| 135,054 | Whitehead | Jan. 21, 1873 |
| 669,251 | Filstrup et al. | Mar. 5, 1901 |
| 2,261,901 | Erdman | Nov. 4, 1941 |